UNITED STATES PATENT OFFICE.

ARTHUR WEINBERG, OF FRANKFORT-ON-THE-MAIN, GERMANY, ASSIGNOR TO LEOPOLD CASSELLA & CO., OF SAME PLACE.

BROWN SULFURETED DYE.

SPECIFICATION forming part of Letters Patent No. 596,559, dated January 4, 1898.

Application filed January 13, 1897. Serial No. 619,074. (Specimens.)

*To all whom it may concern:*

Be it known that I, ARTHUR WEINBERG, a citizen of Prussia, and a resident of Frankfort-on-the-Main, Germany, have invented new and useful Improvements in the Production of a Brown Dye, of which the following is a specification.

If dinitrocresol is heated with four to six parts, by weight, of an alkali sulfid and one to three parts, by weight, of sulfur, a melt of a deep color is obtained, containing a dyestuff of unknown molecular constitution, which has the property of dyeing a brown on unmordanted cotton, especially in presence of sulfids or strong alkalies.

Example: Twenty-five parts, by weight, of dinitrocresol are heated with one hundred and twenty-five parts, by weight, of sulfid of sodium and fifty parts, by weight, of sulfur within one hour to 100° centigrade. The temperature is then gradually raised to about 160° centigrade and the mixture maintained at this temperature until the melt has become solid. The operation generally lasts from two to three hours. The crushed melt can be used directly, or its solution may be cautiously mixed with muriatic acid until it reacts neutral. Then the precipitated dyestuff is filtered off and made into a paste or dried. In this case the dyestuff must be dissolved in some soda-lye or sulfid of soda before dyeing.

My dyestuff is soluble in alkaline solution with a brown color and is fixed without exposure to the air or oxidizing agents. It is soluble in water in presence of sulfids or strong alkalies and insoluble in alcohol, neutral or acidulated water, and its solutions dye unmordanted cotton directly brown.

Having now described the nature of my invention and in what manner the same is to be carried out, I claim as new and desire to secure by Letters Patent—

1. The process of producing a brown coloring-matter by heating one part by weight of dinitrocresol with four to six parts by weight of an alkali sulfid and one to three parts by weight of sulfur substantially as described.

2. The brown coloring-matter produced as hereinbefore described, derived from dinitrocresol which is soluble in water in presence of sulfids or strong alkalies, insoluble in alcohol, neutral or acidulated water; the solutions of which dye unmordanted cotton directly brown substantially as described.

In testimony that I claim the foregoing as my invention I have signed my name, in presence of two witnesses, this 28th day of December, 1896.

ARTHUR WEINBERG.

Witnesses:
 JEAN GRUND,
 FRANK H. MASON.